Patented Dec. 11, 1951

2,577,923

UNITED STATES PATENT OFFICE 2,577,923

METHOD OF PRODUCING PARTS

Walter J. Scott, Hinsdale, and Charles C. Veale, West Chicago, Ill., assignors to Western Electric Company, Incorporated, New York, N. Y., a corporation of New York No Drawing. Continuation of application Serial No. 585,568, March 29, 1945. This application December 28, 1950, Serial No. 203,212

9 Claims. (Cl. 25—156)

This invention relates to methods of producing parts from materials of low specific gravity and particularly to a method of preparing and molding ceramic materials of low specific gravity into parts and this application is a continuation of our co-pending application Serial No. 585,568, filed March 29, 1945, which has become abandoned.

An object of the invention is to provide a simple, efficient and effective method of molding ceramic materials of low specific gravity into parts.

In accordance with one embodiment of the invention, as applied to the forming of electrical insulators, ceramic substances, such as talc, kaolin, magnesium carbonate and barium carbonate are mixed, while subjected to heat, with a temporary binding agent, which may be a halogenated hydrocarbon, such as melted chlorinated naphthalene, to provide a uniform dispersion of the binding agent, after which the mixture is formed under compression into compact dense slugs while subjected to air evacuation to secure a greater degree of compactness. The molded slugs are then disintegrated by crushing and then sieved to desired granular sizes. Mixed with the granulated material is a small amount of magnesium stearate, which forms a thin coating thereof on the granules to prevent them from adhering to a die or mold into which the ceramic granules are entered and dry pressed into a solid coherent mass of the desired shape, which is then heat-treated to drive off the chlorinated naphathalene binder and harden the molded ceramic material comprising an electrical insulator.

In practicing one method embodying the invention, about 60 parts of talc, 15 parts of a suitable clay, such as kaolin, 7.5 parts of magnesium carbonate, and 17.5 parts of barium carbonate in a powdered state are mixed in a suitable heated mixer with about 6% of an organic temporary binding agent, which may be a halogenated hydrocarbon, such as chlorinated naphthalene, in a melted state. The binding agent may be a halogenated hydrocarbon which is solid and wax-like at room temperature and, preferably, as pointed out hereinbefore, is chlorinated naphthalene. The mixture is thoroughly mixed until the chlorinated naphthalene is uniformly dispersed, whereupon it is compressed into compact dense slugs in a suitable die press, which includes a cylinder for receiving the mixture. While compressing the mixture, the cylinder may be air evacuated or the cylinder may be evacuated before compression in order to secure a greater degree of density of the mixture. In some cases, the air evacuation of the cylinder may not be necessary. The slugs are then disintegrated by subjecting them to crushing action by suitable means and the crushed material is then sieved by passing it through a series of screens and the granules remaining on a 60 mesh screen and passing through a 20 mesh screen provides the material in the form of dense, durable granules, to be finally molded. Before entering the sieved granules in a suitable die or mold to form a solid coherent mass in the shape of an electrical insulator, approximately 0.25% of magnesium stearate is mixed with the granules to provide a thin coating of magnesium stearate thereon to prevent them from adhering to the surfaces of the mold.

The compact, durable ceramic granules prepared in the manner above described, and which are molded by a dry press method into electrical insulators, will roll into the die or mold in the filling thereof and leave a constant weight of material in the mold when the material is levelled off at the top of the mold. An apparatus for carrying out this molding of the article was disclosed in the co-pending application of George L. Cherry and Walter J. Scott, Serial No. 581,642, filed March 8, 1945, which has issued as Patent No. 2,488,581 on November 22, 1949. After removal from the mold, the shaped coherent mass of ceramic granules is heat-treated at approximately 2280° F. to drive off the binding agent and harden the ceramic electrical insulator.

What is claimed is:

1. A method of manufacturing ceramic parts consisting in mixing ceramic materials, some of which have a relatively low specific gravity, with an organic temporary binding agent, molding the mixture under pressure into compact dense slugs, crushing the slugs, selecting certain sizes of the crushed material for molding, dry molding the selected material under pressure to the desired form, and heat treating the molded mass to remove the binding agent and harden the remaining ceramic material.

2. A method of manufacturing ceramic parts, consisting in mixing ceramic materials, some of which have a relatively low specific gravity, with an organic temporary binding agent, molding the mixture under pressure while subjected to air evacuation into compact dense slugs, disintegrating the slugs, selecting certain sizes of the disintegrated material for molding, dry molding the selected material under pressure to the desired form, and heat treating the molded mass to 3. A method of manufacturing ceramic parts consisting in mixing, while subjected to heat, talc, kaolin, magnesium carbonate and barium carbonate with an organic temporary binding agent, which is solid and wax-like at room temperature, molding the mixture under pressure into compact dense slugs, distintegrating the slugs, sieving the disintegrated material to desired sizes, dry molding the material under pressure to the desired form, and heat treating the molded mass to remove the binding agent and harden the remaining ceramic material.

4. A method of manufacturing ceramic parts, comprising mixing unfired ceramic materials, some of which have a relatively low specific gravity, with a temporary organic binding agent, molding the mixture of unfired materials under pressure into compart dense slugs, crushing the slugs, selecting certain sizes of the crushed unfired material for molding, coating the selected material with magnesium stearate, dry molding the coated material under pressure to the desired form, and heat treating the molded mass to remove the binding agent and harden the remaining ceramic material by utilizing a single firing step.

5. A single firing step method of manufacturing ceramic parts comprising mixing, while subjected to heat, ceramic materials, some of which have a relatively low specific gravity, with a melted temporary binding agent to form a mixture of unvitrified materials, molding the mixture under pressure into compart dense slugs, crushing the slugs, selecting certain sizes of the crushed material for molding, coating the selected material with magnesium stearate, dry molding the coated material under pressure to the desired form, and heat treating the molded mass to remove the binding agent and harden the remaining ceramic material to form parts by a single firing step.

6. A method of manufacturing ceramic parts comprising mixing, in an unfired condition, talc, kaolin, magnesium carbonate and barium carbonate with melted halogenated hydrocarbon, which is solid and wax-like at room temperature, molding the unfired mixture under pressure into compart dense slugs, crushing the slugs, selecting certain sizes of the crushed unfired material for molding, dry molding the selected unfired material under pressure to the desired form, and heat treating the molded mass to remove the halogenated hydrocarbon and fire the remain material in a single firing operation.

7. A method of manufacturing ceramic parts consisting in mixing, while subjected to heat, talc, kaolin, magnesium carbonate and barium carbonate with melted halogenated hydrocarbon, which is solid and wax-like at room temperature, molding the mixture under pressure into compact dense slugs, crushing the slugs, selecting certain sizes of the crushed material for molding, coating the selected material with magnesium stearate, dry molding the selected material under pressure to the desired form, and heat treating the molded mass to remove the halogenated hydrocarbon and harden the remaining material.

8. A method of manufacturing ceramic parts comprising mixing about 60 parts tac. 15 parts kaolin, 7.5 parts magnesium carbonate and 17.5 parts barium carbonate all in an unfired state with 6% of a halogenated hydrocarbon, which is solid and wax-like at room temperature, molding the mixture of unfired components under pressure into compart dense slugs, distintegrating the slugs to form granules of unfired components, sieving the distintegrated material to desired sizes of granules, dry molding the granules of unfired components under pressure to the desired form, and heat treating the molded mass to remove the halogenated hydrocarbon and harden the remaining material by a single firing operation.

9. A method of manufacturing ceramic parts, utilizing a single firing step, comprising mixing, while subjected to heat, about 60 parts talc, 15 parts kaolin, 7.5 parts magnesium carbonate and 17.5 parts barium carbonate, all in an unfired state, with 6% of melted halogenated hydrocarbon, which is solid and wax-like at room temperature, molding the mixture under pressure into compact dense slugs of unfired components, distintegrating the slugs to provide granules of unfired components, sieving the disintegrated material to desired sizes of granules of unfired components, mixing with the granules of unfired components about 0.25% of magnesium stearate, dry molding the granules of unfired components under pressure to the desired form, and heating the molded mass at a temperature of about 2,280° F. to remove the halogenated hydrocarbon and vitrify the remaining material.

WALTER J. SCOTT.
CHARLES C. VEALE.

No references cited.